(12) United States Patent
Ichihara et al.

(10) Patent No.: US 11,630,358 B2
(45) Date of Patent: Apr. 18, 2023

(54) DISPLAY DEVICE

(71) Applicant: Japan Display Inc., Tokyo (JP)

(72) Inventors: Kazuki Ichihara, Tokyo (JP); Naoyuki Asano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/804,871

(22) Filed: Jun. 1, 2022

(65) Prior Publication Data

US 2022/0390803 A1 Dec. 8, 2022

(30) Foreign Application Priority Data

Jun. 4, 2021 (JP) .............................. JP2021-094379

(51) Int. Cl.
*G02F 1/1362* (2006.01)

(52) U.S. Cl.
CPC .............................. *G02F 1/136286* (2013.01)

(58) Field of Classification Search
CPC ........... G02F 1/136286; G02F 1/13452; G02F 1/133616
See application file for complete search history.

(56) References Cited

U.S. PATENT DOCUMENTS

2004/0224598 A1* 11/2004 Tanaka ................ G02F 1/13452
445/24
2017/0269433 A1* 9/2017 Sugiyama ............ G02B 6/0031

FOREIGN PATENT DOCUMENTS

JP 2021-033043 A 3/2021

* cited by examiner

*Primary Examiner* — James A Dudek
(74) *Attorney, Agent, or Firm* — Maier & Maier, PLLC

(57) ABSTRACT

According to one embodiment, a display device includes a first substrate having a first surface, a second surface, and a first side surface, a second substrate having a second side surface and being opposed to the first surface, a light source provided along the second side surface, a wiring substrate opposed to the second surface, a first adhesive layer bonding the second surface to the wiring substrate, and a flexible wiring substrate electrically connecting the first substrate with the wiring substrate. The first substrate includes an extending portion that includes the first side surface and extends further than the second side surface, the flexible wiring substrate is mount on the extending portion.

10 Claims, 8 Drawing Sheets

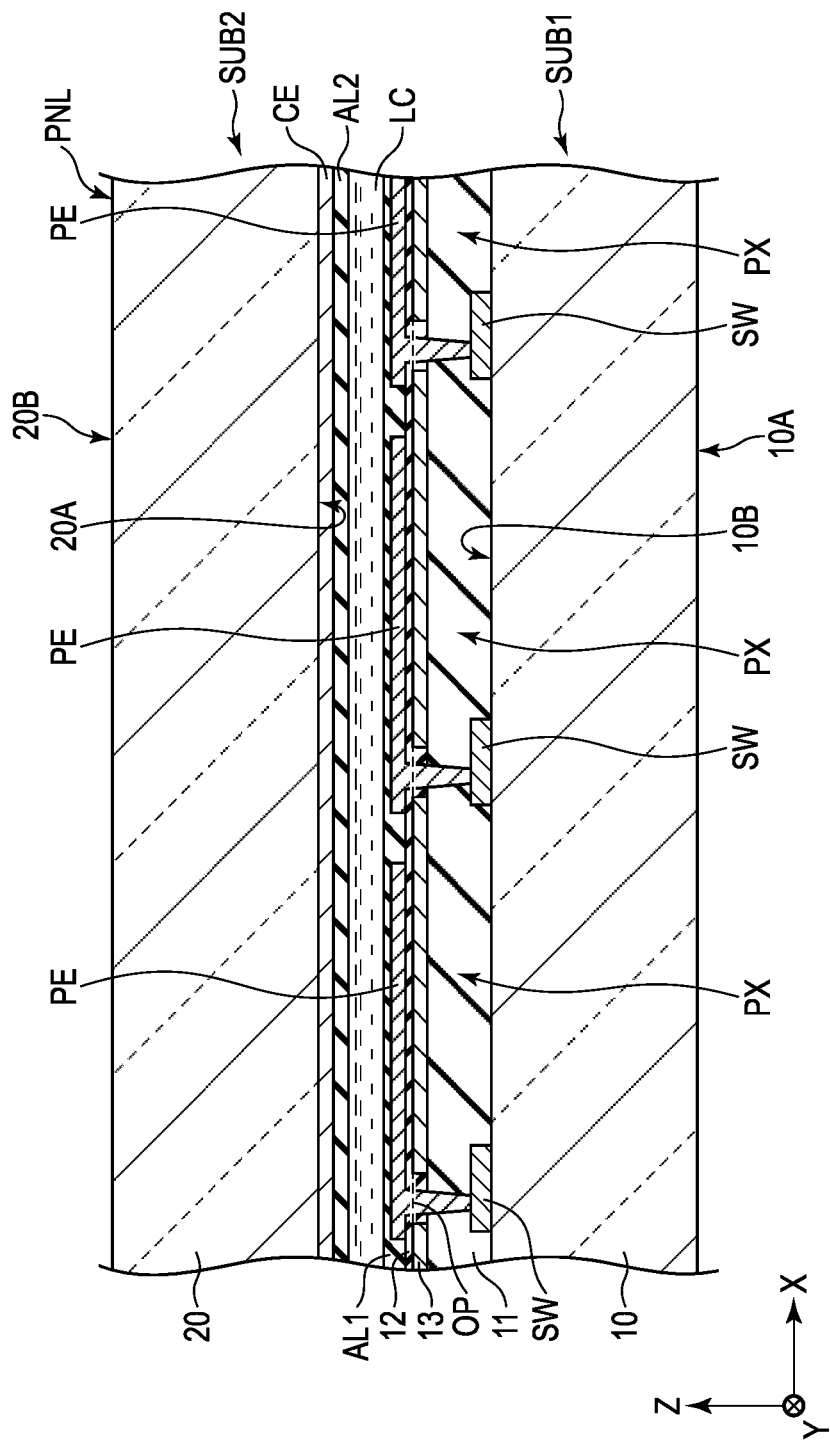
F I G. 3

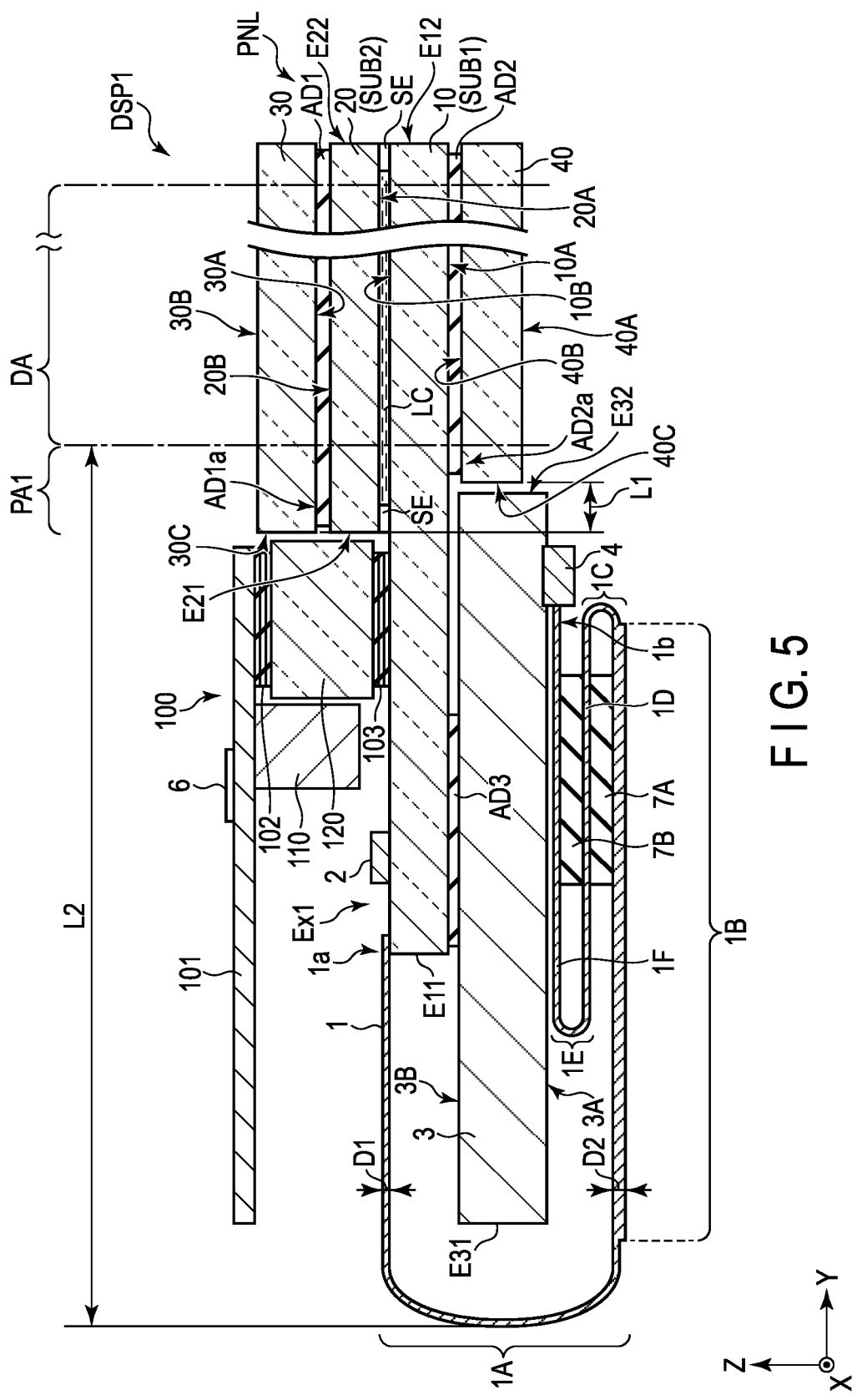
F I G. 5

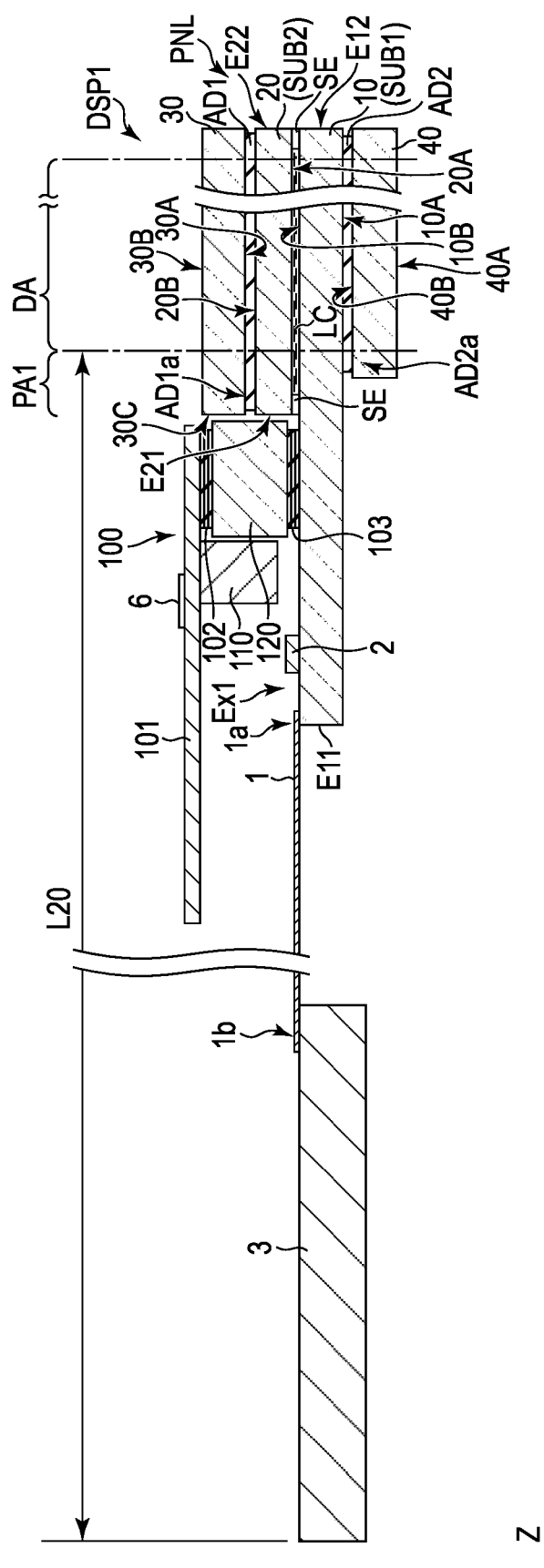
F I G. 6

DISPLAY DEVICE

CROSS-REFERENCE TO RELATED APPLICATIONS

This application is based upon and claims the benefit of priority from Japanese Patent Application No. 2021-094379, filed Jun. 4, 2021, the entire contents of which are incorporated herein by reference.

FIELD

Embodiments described herein relate generally to a display device.

BACKGROUND

In recent years, a display device comprising a display panel including a polymer dispersed liquid crystal layer (PDLC) has been proposed. The polymer dispersion liquid crystal layer can switch a scattering state in which light is scattered and a transmitted state in which light is transmitted. The display device can display images by switching the display panel to the scattering state. In contrast, the user can visually recognize a background through the display panel by switching the display panel to the transmitted state. Conventionally, reducing a frame portion located outside the display area, so-called narrowing the frame, has been required for the display device.

BRIEF DESCRIPTION OF THE DRAWINGS

FIG. 3 is a cross-sectional view showing a configuration example of the display panel shown in FIG. 1 and FIG. 2.

FIG. 5 is a cross-sectional view showing a configuration example of the display device according to the first embodiment.

FIG. 6 is a cross-sectional view showing a comparative example of the display device shown in FIG. 5.

DETAILED DESCRIPTION

Figure 1:
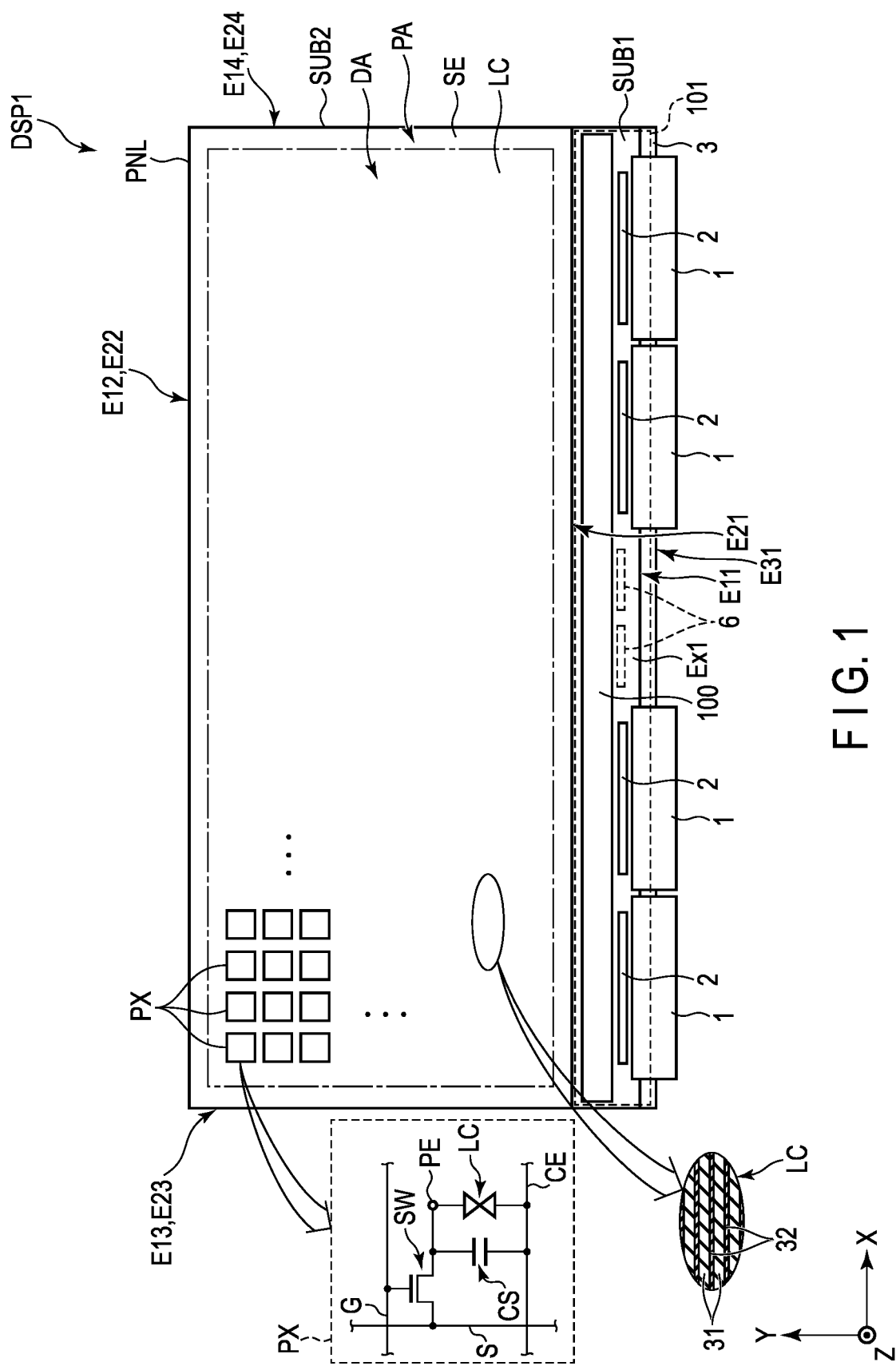
FIG. 1 is a plan view showing a configuration example of a display device according to a first embodiment.

In general, according to one embodiment, a display device comprises a first substrate having a first surface, a second surface on a side opposite to the first surface, and a first side surface connecting the first surface with the second surface, a second substrate having a second side surface and being opposed to the first surface, a light source provided along the second side surface of the second substrate, a wiring substrate opposed to the second surface of the first substrate, a first adhesive layer bonding the second surface to the wiring substrate, and a flexible wiring substrate electrically connecting the first substrate with the wiring substrate. The first substrate includes an extending portion that includes the first side surface and extends further than the second side surface of the second substrate, the flexible wiring substrate is mount on the extending portion.

According to the above configuration, a display device capable of narrowing a frame can be provided.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention.

In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In each of the embodiments, the first direction X, second direction Y, and third direction Z are defined as shown in each figure. The first direction X, the second direction Y, and the third direction Z are orthogonal to each other, but may cross each other at an angle other than 90 degrees. In addition, the third direction Z is defined as an upper or upward direction while a direction opposite to the third direction Z is defined as a lower or downward direction, in each of the present embodiments.

Expressions such as "a second component above a first component" and "a second component beneath a first component" mean that the second component may be in contact with the first component or may be located apart from the first component. Viewing an X-Y plane defined by the first direction X and the second direction Y is hereinafter referred to as planar view.

Each of the embodiments discloses a translucent liquid crystal display device having a visually recognizable background, to which polymer dispersed liquid crystal is applied. Incidentally, each of the embodiments does not prevent application of individual technical ideas disclosed in each embodiment to other types of display devices.

First Embodiment

Figure 2:
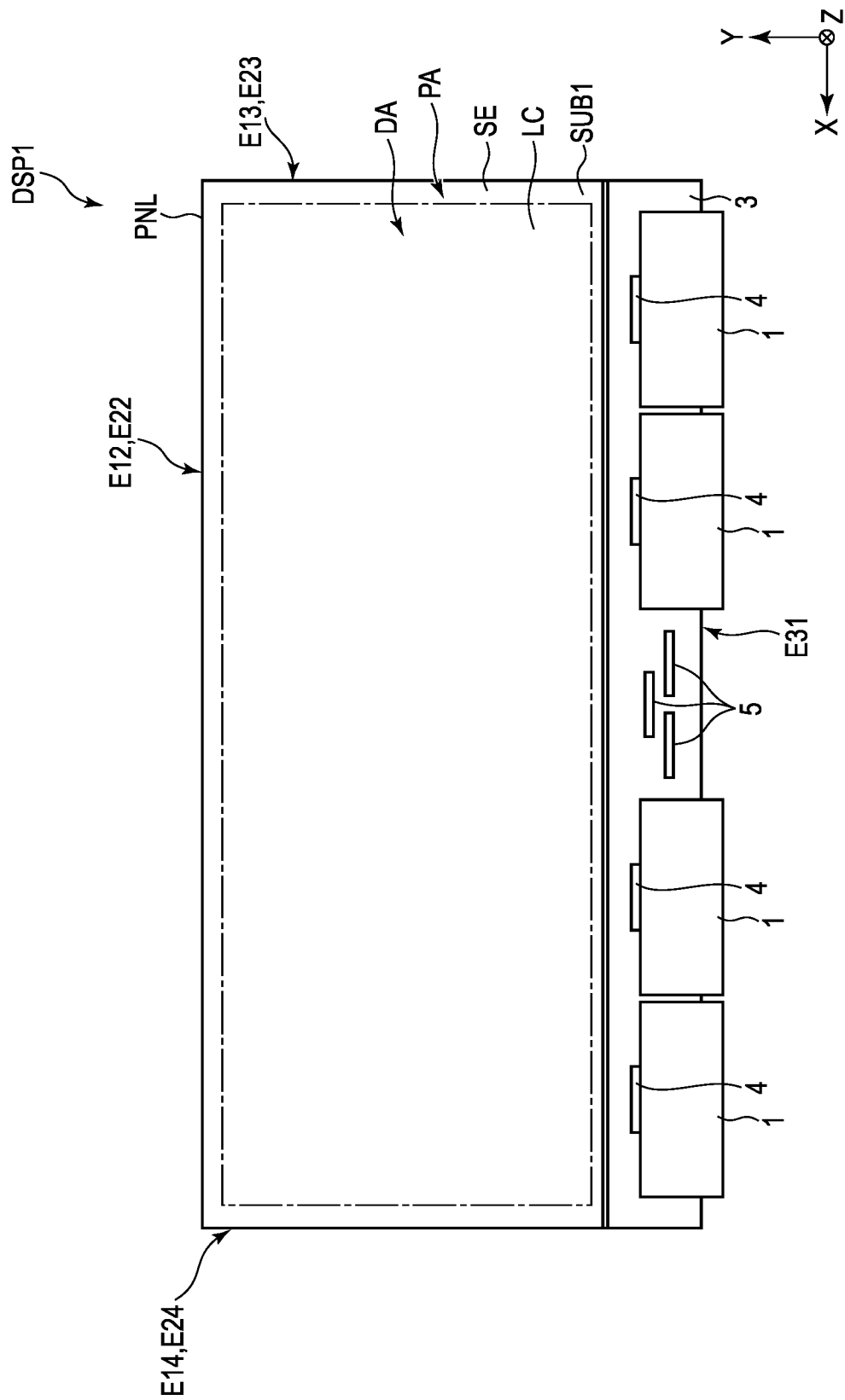
FIG. 2 is a bottom view showing a configuration example of the display device according to the first embodiment.

FIG. 1 is a plan view showing a configuration example of a display device DSP1 of a first embodiment. FIG. 2 is a bottom view showing a configuration example of the display device DSP1 of the first embodiment.

As shown in FIG. 1 and FIG. 2, the display device DSP1 comprises a display panel PNL including a polymer dispersion liquid crystal layer (hereinafter simply referred to as a liquid crystal layer LC), a flexible wiring substrate 1, an IC chip 2, a wiring substrate 3, and a light emitting module 100. The display device DSP1 further comprises a first cover member 30 and a second cover member 40, which will be described later.

The display panel PNL comprises a first substrate SUB1, a second substrate SUB2, a liquid crystal layer LC, and a seal SE. The first substrate SUB1 and the second substrate SUB2 are shaped in a flat plate parallel to the X-Y plane. The first substrate SUB1 and the second substrate SUB2 overlap each other in planar view. The first substrate SUB1 and the second substrate SUB2 are bonded to each other by the seal SE. The liquid crystal layer LC is disposed between the first substrate SUB1 and the second substrate SUB2 and is sealed by seal SE.

As enlarged and schematically shown in FIG. 1, the liquid crystal layer LC includes polymer 31 and liquid crystal molecules 32. For example, the polymer 31 is liquid crystal polymer. The polymer 31 is formed in a stripe shape extending along the first direction X and is aligned in the second direction Y. The liquid crystal molecules 32 are dispersed in gaps of the polymer 31 and are aligned such that their major axes extend in the first direction X. The polymer 31 and the liquid crystal molecules 32 have optical anisotropy or refractive anisotropy. The response performance of the polymer 31 to the electric field is lower than the response performance of the liquid crystal molecules 32 to the electric field.

For example, the orientation of alignment of the polymers 31 is hardly varied irrespective of the presence or absence of the electric field. In contrast, the orientation of alignment of the liquid crystal molecules 32 is varied in accordance with the electric field in a state in which a voltage higher than or equal to a threshold value is applied to the liquid crystal layer LC. In a state in which the voltage is not applied to the liquid crystal layer LC, optical axes of the polymer 31 and the liquid crystal molecules 32 are parallel to each other and the light made incident on the liquid crystal layer LC is transmitted without being substantially scattered in the liquid crystal layer LC (transmitted state). In a state in which the voltage is applied to the liquid crystal layer LC, the optical axes of the polymer 31 and the liquid crystal molecules 32 intersect each other and the light made incident on the liquid crystal layer LC is scattered in the liquid crystal layer LC (scattered state).

The display panel PNL includes a display area DA on which images are displayed and a peripheral area PA which surrounds the display area DA in a frame shape. The seal SE is disposed in the peripheral area PA. The display area DA includes pixels PX arrayed in a matrix in the first direction X and the second direction Y.

As enlarged in FIG. 1, each pixel PX comprises a switching element SW, a pixel electrode PE, a common electrode CE, a liquid crystal layer LC and the like. The switching element SW is constituted by, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y.

The pixel electrode PE is electrically connected to the switching element SW. The common electrode CE is provided commonly to the plurality of pixel electrodes PE. The liquid crystal layer LC (particularly, liquid crystal molecules 32) is driven by an electric field produced between the pixel electrode PE and the common electrode CE. A capacitor CS is formed between, for example, an electrode having the same electric potential as the common electrode CE and an electrode having the same potential as the pixel electrode PE.

The scanning line G, the signal line S, the switching element SW, and the pixel electrode PE are provided on the first substrate SUB1, and the common electrode CE is provided on the second substrate SUB2, which will be described with reference to FIG. 3. On the first substrate SUB1, the scanning line G and the signal line S are electrically connected to the flexible wiring substrate 1 or IC chip 2.

The first substrate SUB1 includes a pair of side surfaces E11 and E12 extending in the first direction X, and a pair of side surfaces E13 and E14 extending in the second direction Y. In the example shown in FIG. 1 and FIG. 2, the side surfaces E11 and E12 are the side surfaces formed along the longer sides, and the side surface E13 and E14 are the side surfaces formed along the shorter sides.

The second substrate SUB2 includes a pair of side surfaces E21 and E22 extending in the first direction X, and a pair of side surfaces E23 and E24 extending in the second direction Y. In the example shown in FIG. 1 and FIG. 2, the side surfaces E21 and E22 are the side surfaces formed along the longer sides, and the side surface E23 and E24 are the side surfaces formed along the shorter sides.

In the example shown in FIG. 1 and FIG. 2, in planar view, the side surfaces E12 and E22 overlap, the side surfaces E13 and E23 overlap, and the side surfaces E14 and E24 overlap in planar view, but may not overlap.

The first substrate SUB1 includes an extending portion Ex1 extending farther than the side surface E21 of the second substrate SUB2. From the other viewpoint, the extending portion Ex1 does not overlap the second substrate SUB2. The side surface E11 is included in the extension portion Ex1. The side surface E21 is located between the side surface E11 and the display area DA in planar view. Incidentally, the shape of the first substrate SUB1 and the second substrate SUB2 is not limited to a rectangular shape.

The flexible wiring substrate 1 and the IC chip 2 are mounted on the extending portion Ex1. The flexible wiring substrate 1 is, for example, a flexible printed circuit board and is bent toward the wiring substrate 3 in the example shown in FIG. 1 and FIG. 2. The IC chip 2 incorporates, for example, a display driver which outputs a signal necessary for image display, and the like. Incidentally, the IC chip 2 may be mounted on the flexible wiring circuit 1.

In the example shown in FIG. 1 and FIG. 2, the display device DSP1 comprises a plurality of (for example, four) flexible wiring substrates 1, but may comprise a single flexible wiring substrate 1. In addition, the display device DSP1 comprises a plurality of (for example, four) IC chips 2 but may comprise a single IC chip 2.

The wiring substrate 3 is, for example, a printed circuit board. The wiring substrate 3 is more rigid than, for example, the flexible wiring substrate 1. From another point of view, the thickness of the wiring substrate 3 is larger than, for example, the thickness of the flexible wiring substrate 1. In other words, the wiring substrate 3 is more difficult to bend than the flexible wiring substrate 1. As shown in FIG. 2, the wiring substrate 3 includes a connector 4. The flexible wiring substrate 1 is connected to the wiring substrate 3 via the connector 4. From another viewpoint, the flexible wiring substrate 1 electrically connects the first substrate SUB1 to the wiring substrate 3.

Furthermore, the wiring substrate 3 is connected to a control unit (not shown) via a connector 5. Various signals and power supply voltages output from the control unit are output to the display panel PNL via the wiring substrate 3 and the flexible wiring substrate 1. The wiring substrate 3 includes a side surface E31 at a position protruding from the side surface E11 of the first substrate SUB1. The side surface E11 is located between the side surface E21 and the side surface E31 in planar view.

Details of the light emitting module 100 will be described below, and the light emitting module 100 is provided along the side surface (or the edge portion) of the display panel PNL. In the example shown in FIG. 1, the light emitting module 100 is provided at the extending portion Ex1. The light emitting module 100 includes a wiring substrate 101. The wiring substrate 101 is electrically connected to the outside via a connector 6 for inputting various signals and power supply voltages. The wiring substrates 3 and 101 may include portions extending from the display panel PNL in the first direction X and a direction opposite to the first direction X.

FIG. 3 is a cross-sectional view showing a configuration example of the display panel PNL shown in FIG. 1 and FIG. 2. The first substrate SUB1 includes a transparent substrate 10, insulating films 11 and 12, a capacitive electrode 13, switching elements SW, the pixel electrodes PE, and an alignment film AL1. The transparent substrate 10 includes a main surface 10A (second surface) and a main surface 10B (first surface) on a side opposite to the main surface 10A.

The switching elements SW are provided on the main surface 10B side. The insulating film 11 is provided on the main surface 10B and covers the switching elements SW. The scanning lines G and signal lines S shown in FIG. 1 are provided between the transparent substrate 10 and the insulating film 11 but their illustration is omitted. The capacitive electrode 13 is provided between the insulating film 11 and the insulating film 12.

The pixel electrode PE is provided between the insulating film 12 and the alignment film AL1, in each pixel PX. In other words, the capacitance electrode 13 is provided between the transparent substrate 10 and pixel electrodes PE. The pixel electrodes PE are electrically connected to the switching elements SW through opening portions OP of the capacitive electrode 13. The pixel electrodes PE overlap the capacitance electrode 13 with the insulating film 12 sandwiched therebetween, to form the capacitance CS of the pixels PX. The alignment film AL1 covers the pixel electrodes PE.

The second substrate SUB2 is opposed to the first substrate SUB1. The second substrate SUB2 includes a transparent substrate 20, a common electrode CE, and an alignment film AL2. The transparent substrate 20 includes a main surface 20A and a main surface 20B on a side opposite to the main surface 20A. The main surface 20A of the transparent substrate 20 faces the main surface 10B of the transparent substrate 10.

The common electrode CE is provided on the main surface 20A. The alignment film AL2 covers the common electrode CE. The liquid crystal layer LC is located between the main surface 10B and the main surface 20A and is in contact with the alignment films AL1 and AL2. In the second substrate SUB2, a light-shielding layer may be provided just above each of the switching elements SW, scanning lines G, and signal lines S. Alternatively, a transparent insulating film may be provided between the transparent substrate 20 and the common electrode CE or between the common electrode CE and the alignment film AL2.

The common electrode CE is disposed across a plurality of pixels PX and opposed to the plurality of pixel electrodes PE in the third direction Z. The common electrode CE has the same potential as the capacitive electrode 13. The liquid crystal layer LC is located between the pixel electrode PE and the common electrode CE.

The transparent substrates 10 and 20 are, for example, glass substrates but may be insulating substrates such as plastic substrates. The insulating film 11 includes, for example, a transparent inorganic insulating film of silicon oxide, silicon nitride, silicon oxynitride or the like, and a transparent organic insulating film of acrylic resin or the like. The insulating film 12 is, for example, a transparent inorganic insulating film of silicon nitride or the like. The capacitive electrode 13, the pixel electrodes PE, and the common electrode CE are transparent electrodes formed of, for example, a transparent conductive material such as indium tin oxide (ITO) or indium zinc oxide (IZO).

Figure 4:
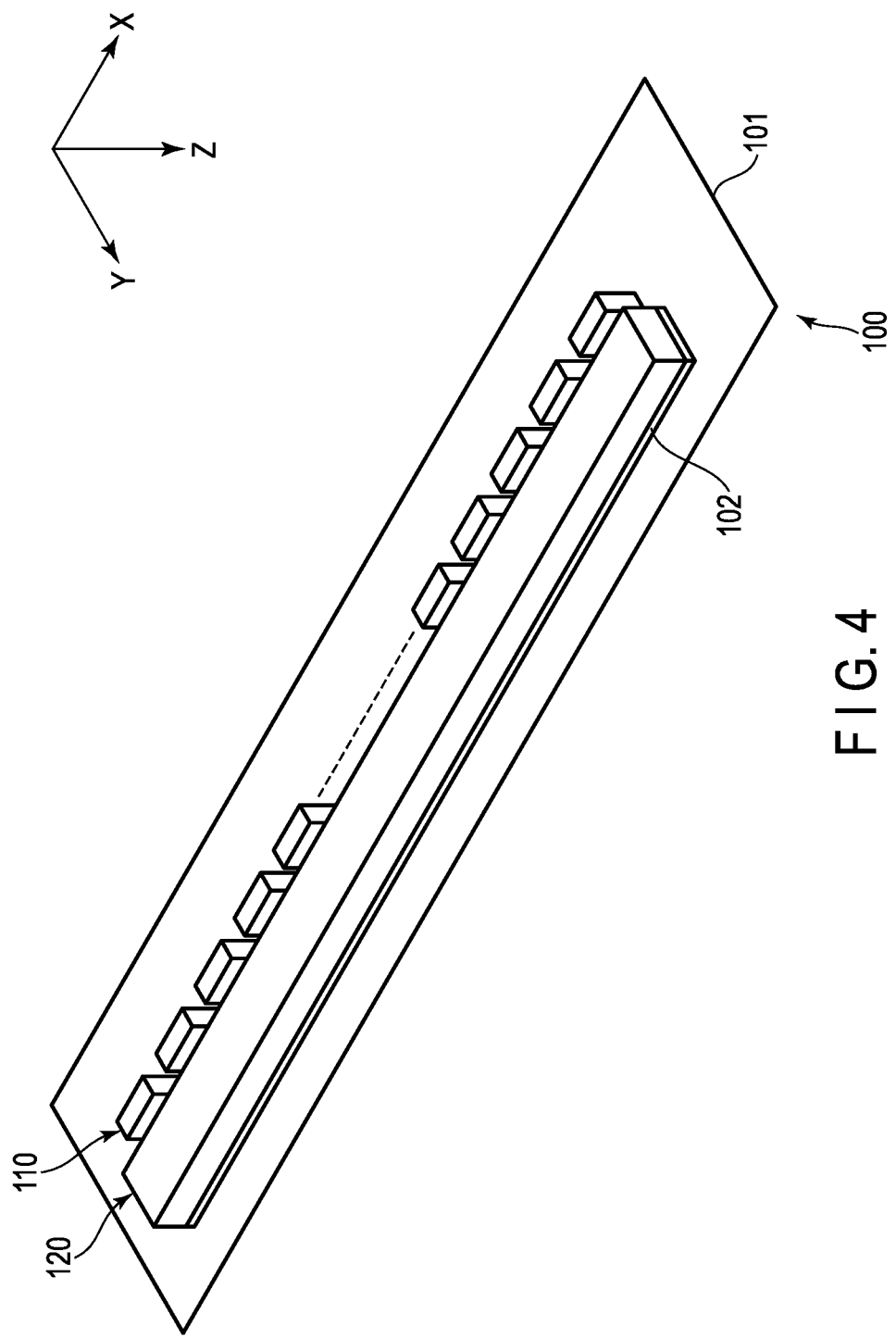
FIG. 4 is a perspective view showing a configuration example of a light emitting module shown in FIG. 1.

FIG. 4 is a perspective view showing a configuration example of the light emitting module 100 shown in FIG. 1. The light emitting module 100 comprises a wiring substrate 101, an adhesive layer 102, a plurality of light sources 110, and a light guide (for example, prism lens) 120.

The plurality of light sources 110 are opposed to the light guide 120 in the second direction Y. The plurality of light sources 110 are spaced apart with intervals along the first direction X and are electrically connected to the wiring substrate 101.

In the light sources 110, red LEDs, green LEDs, and blue LEDs are continuously aligned. Alternatively, the light sources 110 is not limited to an arrangement in which LEDs of three different colors are continuously aligned, but only white light sources emitting white light may be continuously aligned.

The light guide 120 is formed of, for example, resin, is shaped in a transparent rod, and extends along the first direction X. The light guide 120 has, for example, a plurality of curved surfaces corresponding to the respective light sources 110, to control the width in the first direction X of the light irradiated from the light sources 110. The light guide 120 is bonded to the wiring substrate 101 by the adhesive layer 102. The light guide 120 may be constituted by a plurality of light guides. The number of light sources 110 and light guides 120 in the light emitting module 100 is not limited to the illustrated example.

FIG. 5 is a cross-sectional view showing a configuration example of the display device DSP1 of the first embodiment.

As described above, the display device DSP1 comprises the display panel PNL, the flexible wiring substrate 1, the IC chip 2, the wiring substrate 3, and the light emitting module 100. The only main parts of the display panel PNL is illustrated and simplified.

The display device DSP1 further comprises the adhesive layer AD1 bonding the first cover member 30, the second cover member 40, the second substrate SUB2 and the first cover member 30, the adhesive layer AD2 bonding the first substrate SUB1 and the second cover member 40, and the adhesive layer AD3 (first adhesive layer) bonding the first substrate SUB1 and the wiring substrate 3. In the example shown in FIG. 5, the first cover member 30 and the second cover member 40 overlap the display area DA in the third direction Z, but do not overlap the extending portion Ex1. In addition, the wiring substrate 3 overlaps the extending portion Ex1 in the third direction Z, but does not overlap the display area DA.

As described above with reference to FIG. 1, the transparent substrate 10 includes the side surface E11 (first side surface), in the first substrate SUB1. The side surface E11 connects the main surface 10A with the main surface 10B. In the second substrate SUB2, the transparent substrate 20 includes the side surface E21 (second side surface). The side surface E21 connects the main surface 20A with the main surface 20B. The side surface E11 protrudes from the side surface E21 of the transparent substrate 20 in the direction opposite to the second direction Y. The side surfaces E11 and E21 are the surfaces substantially parallel to an X-Z plane defined by the first direction X and the third direction Z.

The first cover member 30 includes a main surface 30A, a main surface 30B on the side opposite to the main surface 30A, and the side surface 30C that connects the main surface 30A with the main surface 30B. The main surfaces 30A and 30B are the surfaces substantially parallel to the X-Y plane. The main surface 30A is opposed to the main surface 20B of the transparent substrate 20. The side surface 30C is the surface substantially parallel to the X-Z plane. The side surface 30C is located on the light emitting module 100 side in the second direction Y. In the example shown in FIG. 5, the side surface 30C is located directly above the side surface E21, but may be displaced in the direction Y.

The second cover member 40 includes a main surface 40A, a main surface 40B on the side opposite to the main surface 40A, and a side surface 40C that connects the main surface 40A with the main surface 40B. The main surfaces 40A and 40B are the surfaces substantially parallel to the X-Y plane. The main surface 40B is opposed to the main surface 10A of the transparent substrate 10. The side surface 40C is substantially parallel to the X-Z plane. The side surface 40C is located on the light emitting module 100 side in the second direction Y. The side surface 40C is opposed to the wiring substrate 3.

The side surface 40C is located more closely to the display area DA side than the side surface 30C in the second direction Y. In the example shown in FIG. 5, the side surface 40C is not located directly under the side surface 30C in the third direction Z, but overlaps the peripheral area PA1 between the side surface E21 (side surface 30C) and the display area DA. From another viewpoint, the side surface 40C is located between the side surface 30C and the display area DA in the second direction Y. In the example shown in FIG. 5, the side surface 40C is positioned away from the side surface 30C in the second direction Y in a distance L1. In contrast, in the example shown in FIG. 5, the side surface on the side opposite to the side surface 40C in the second cover member 40 is located directly below the side surface opposite to the side surface 30C.

The adhesive layer AD1 bonds the main surface 20B of the transparent substrate 20 to the main surface 30A of the first cover member 30. The adhesive layer AD1 includes an end portion AD1a on the side surface 30C side in the second direction Y. The adhesive layer AD1 is not formed directly below the side surface 30C, but may be formed directly below the side surface 30C.

The adhesive layer AD2 bonds the main surface 10A of the transparent substrate 10 to the main surface 40B of the second cover member 40. The adhesive layer AD2 includes an end portion AD2a on the side surface 40C side in the second direction Y. The adhesive layer AD2 is not formed directly above the side surface 40C, but may be formed directly above the side surface 40C.

The adhesive layers AD1 and AD2 overlap the display area DA in the third direction Z. From another viewpoint, the liquid crystal layer LC in the display area DA is located between the adhesive layers AD1 and AD2 in the third direction Z. The adhesive layers AD1 and AD2 can block, for example, most of the ultraviolet rays. Blocking includes reflecting and absorbing ultraviolet rays, and the like. An influence of the ultraviolet rays included in the external light to the liquid crystal layer LC can be suppressed by forming the adhesive layers AD1 and AD2 so as to cover the display area DA.

The end portions AD1a and AD2a overlap the peripheral area PA1 in the third direction Z. The end portion AD2a is located more closely to the display area DA side than the end portion AD1a. In the example shown in FIG. 5, the end portion AD2a is located between the end portion AD1a and the display area DA, and between the side surface 40C and the display area DA, in the second direction Y. The adhesive layers AD1 and AD2 are formed of, for example optical clear adhesive (OCA) or the like.

In the example shown in FIG. 5, each of the transparent substrate 10, the transparent substrate 20, the first cover member 30, and the second cover member 40 has a substantially equal thickness along the third direction Z. The first cover member 30 and the second cover member 40 are, for example, glass substrates, but may also be insulating substrates such as plastic substrates.

The light emitting module 100 overlaps the extending portion Ex1 in the third direction Z. The light sources 110 and the light guide 120 are provided between the extending portion Ex1 of the transparent substrate 10 and the wiring substrate 101, in the third direction Z. In the example shown in FIG. 5, the light sources 110 and the light guide 120 are provided along the side surface E21. The light guide 120 is located between the light sources 110 and the side surface E21, and between the light sources 110 and the side surface 30C, in the second direction Y.

The light guide 120 is bonded to the wiring substrate 101 by the adhesive layer 102 and is bonded to the extending portion Ex1 by the adhesive layer 103. The adhesive layers 102 and 103 are formed with, for example, double-sided tapes or the like. Each of the adhesive layers 102 and 103 is constituted by, for example, a reflective layer and adhesive layers formed on both sides of the reflective layer.

Next, the light emitted from the light source 110 will be described. The light source 110 emits light toward at least one of the side surface 30C and the side surface E21. In the example shown in FIG. 5, the light source 110 emits light toward the side surface 30C and the side surface E21. The light emitted from the light source 110 is moderately diffused in the light guide 120, made incident on the transparent substrate 20 from the side surface E21, and made incident on the first cover member 30 from the side surface 30C.

The light incident on the transparent substrate 20 and the first cover member 30 propagates through the inside of the display panel PNL while repeatedly reflected. The light made incident on the liquid crystal layer LC to which no voltage is applied is transmitted through the liquid crystal layer LC while hardly scattered.

In addition, the light made incident on the liquid crystal layer LC to which the voltage is applied is scattered in the liquid crystal layer LC. The display device DSP1 allows images to be observed from the main surface 30B side and also allows images to be observed from the main surface 40A side. In addition, even when the display device DSP1 is observed from the main surface 30B side or observed from the main surface 40A side, a background of the display device DSP1 can be observed via the display device DSP1.

The wiring substrate 3 includes a main surface 3B (third surface) opposed to the main surface 10A, a main surface 3A (fourth surface) on a side opposite to the main surface 3B, and a pair of side surfaces E31 and E32. The connector 4 to which the flexible wiring substrate 1 is connected is provided on the main surface 3A. The main surfaces 3A and 3B are the surfaces substantially parallel to the X-Y plane. A pair of side surfaces E31 and E32 are the surfaces substantially parallel to the X-Z plane. The pair of side surfaces E31 and E32 connect the main surface 3A with the main surface 3B.

In the example shown in FIG. 5, the connector 4 is located more closely to the side surface E32 side than a central portion in the second direction Y of the main surface 3A of the wiring substrate 3. The connector 4 overlaps the light guide 120 in, for example, the third direction Z. However, the position of the connector 4 on the main surface 3A is not limited to the example shown in the figure.

The wiring substrate 3 protrudes from the side surface E11 of the transparent substrate 10. From another viewpoint, the side surface E31 protrudes from the side surface E11 of the transparent substrate 10 in the direction opposite to the second direction Y. The side surface E32 is located on the side opposite to the side surface E31, and opposed to the side surface 40C of the second cover member 40. The wiring substrate 3 is aligned with the second cover member 40 in the second direction Y, and is located on the left side of the second cover member 40 in the example shown in FIG. 5.

The adhesive layer AD3 bonds the main surface 10A of the transparent substrate 10 to the main surface 3B of the wiring substrate 3. The adhesive layer AD3 is not formed directly above the side surface E32 of the wiring board 3, but may be formed directly above the side surface E32. The adhesive layer AD3 is formed with, for example, a double-sided tape or the like.

The side surface E32 of the wiring substrate 3 overlaps the peripheral area PA1 in the third direction Z. From another viewpoint, the side surface E32 is located between the side surfaces 40C and 30C in the second direction Y. In the example shown in FIG. 5, the wiring substrate 3 overlaps the first cover member 30 and the transparent substrate 20 in the third direction Z. The adhesive layer AD3 does not overlap the peripheral area PA1 in the third direction Z, but may be formed up to the position where it overlaps the peripheral area PA1.

The flexible wiring substrate 1 includes a first end portion 1a and a second end portion 1b on a side opposite to the first end portion 1a. The first end portion 1a is connected to the extending portion Ex1 of the first substrate SUB1, and the second end portion 1b is connected to the connector 4 provided on the wiring substrate 3.

The flexible wiring substrate 1 further includes a first bend portion 1A, a thick portion 1B, a second bend portion 1C, a first portion 1D, a third bend portion 1E, and a second portion 1F, from the first end portion 1a side, between the first end portion 1a and the second end portion 1b. The flexible wiring substrate 1 is bent to the side of the main surface 10A of the transparent substrate 10 to straddle the wiring substrate 3 by the first bend portion 1A. The extending portion Ex1 and the wiring substrate 3 are located between the bent parts of the flexible wiring substrate 1 in the third direction Z.

The thick portion 1B is located between the first bend portion 1A and the second end portion 1b. The thick portion 1B overlaps the wiring substrate 3 in the thickness direction (third direction Z) of the transparent substrate 10. The thickness D2 of the thick portion 1B is larger than, for example, the thickness of the portions (first bend portion 1A, second bend portion 1C, first portion 1D, third bend portion 1E, and second portion 1F) other than the thick portion 1B (D2>D1). From another viewpoint, the thick portion 1B has much rigidity and is more difficult to bend than the portions other than the thick portion 1B.

On the thick portion 1B, lines are formed on both sides of a base material formed of, for example, polyimide. From the other viewpoint, for example, more layers than the portions other than the thick portion 1B are formed on the base material, in the thick portion 1B. In addition, for example, the width of the thick portion 1B in the first direction X is substantially equal to the width of the first bent portion 1A in the first direction X and is smaller than the widths of the second bend portion 1C, the first portion 1D, the third bend portion 1E, and the second portion 1F in the first direction X.

The second bend portion 1C is located between the thick portion 1B and the second end portion 1b, and the first portion 1D is located between the second bend portion 1C and the second end portion 1b. The third bend portion 1E is located between the first portion 1D and the second end portion 1b, and the second portion 1F is located between the third bend portion 1E and the second end portion 1b. The second bend portion 1C is located more closely to the display area DA side than the first bend portion 1A in the second direction Y. The third bend portion 1E is located between the first bend portion 1A and the second bend portion 1C in the second direction Y.

The flexible wiring substrate 1 is bent by the second bend portion 1C, and the first portion 1D is located between the thick portion 1B and the wiring substrate 3 in the third direction Z. Furthermore, the flexible wiring substrate 1 is bent by the third bend portion 1E, and the second portion 1F is located between the first portion 1D and the wiring substrate 3 in the third direction Z.

In the example of FIG. 5, the width of the thick portion 1B in the second direction Y is larger than the widths of the first portion 1D and the second portion 1F in the second direction Y. In addition, in the example of FIG. 5, the widths of the first portion 1D and the second portion 1F in the second direction Y are substantially equal to each other, but the width of the first portion 1D in the second direction Y may be larger or smaller than the width of the second portion 1F in the second direction Y.

The flexible wiring substrate 1 is bent in an S-letter shape in cross-sectional view viewing the Y-Z plane defined by the second direction Y and the third direction Z. The flexible wiring substrate 1 can be connected to the connector 4 located on the side surface E32 side of the flexible wiring board 1 can be bent by the side E3 of the wiring substrate 3 and the width of the flexible wiring substrate 1 in the second direction Y can be reduced at the connection, by bending the flexible wiring substrate 1 by not only the first bend portion 1A, but also the second bend portion 1C and the third bend portion 1E. In this case, most parts of the thick portion 1B overlap the wiring substrate 3 in the third direction Z.

The display device DSP1 further comprises an adhesive layer 7A (second adhesive layer) bonding the thick portion 1B to the first portion 1D, and an adhesive portion 7B (third adhesive layer) bonding the first portion 1D to the second portion 1F. The adhesive layers 7A and 7B are formed with, for example, double-sided tapes or the like. The thick portion 1B, the adhesive layer 7A, the first portion 1D, the adhesive layer 7B, and the second portion 1F are aligned in this order, in the third direction Z, below the wiring substrate 3.

In the example shown in FIG. 5, the widths of the adhesive layers 7A and 7B in the second direction Y are substantially equal to each other, but the width of the adhesive layer 7A in the second direction Y may be larger than the width of the adhesive layer 7B in the second direction Y or the width of the adhesive layer 7A in the second direction Y may be smaller than the width of the adhesive layer 7B in the second direction Y.

In the example shown in FIG. 5, the thicknesses of the adhesive layers 7A and 7B in the third direction Z are substantially equal to each other, but the thickness of the adhesive layer 7A in the third direction Z may be larger than that of the adhesive layer 7B in the third direction Z or the thickness of the adhesive layer 7A in the third direction Z may be smaller than that of the adhesive layer 7B in the third direction Z. The adhesive layer 7A overlaps the adhesive layer 7B in the third direction Z, but may not overlap the adhesive layer 7B and may be displaced in the second direction Y.

In the example shown in FIG. 5, the thick portion 1B and the first portion 1D do not overlap the connector 4 in the third direction Z, but the thick portion 1B and the first portion 1D may overlap the connector 4. In this case, the second bend portion 1C may be located between the connector 4 and the side surface E32 of the wiring substrate 3 in the second direction Y or may overlap the connector 4 in the third direction Z.

The adhesive layers 7A and 7B suppress spreading of the flexible circuit substrate 1 to the third direction Z. In the example shown in FIG. 5, the adhesive layers 7A and 7B are provided, but the only adhesive layer 7A may be provided between the thick portion 1B and the first portion 1D, the only adhesive layer 7B may be provided between the first portion 1D and the second portion 1F, or each of the adhesive layers 7A and 7B may not be provided.

FIG. 6 is a cross-sectional view showing a comparative example of the display device DSP1 shown in FIG. 5. In the example shown in FIG. 6, the wiring substrate 3 does not overlap the transparent substrate 10 in the third direction Z, and is aligned with the transparent substrate 10 in the second direction Y, and is located on the left side of the transparent substrate 10 in the example shown in FIG. 6. The flexible wiring substrate 1 is not bent. The flexible wiring substrate 1 is mounted on transparent substrate 10 at the same position as in the case shown in FIG. 5. In FIG. 6, illustration of the connector 4 is omitted.

In the example shown in FIG. 6, a distance L20 from the display area DA to the side surface located on a side opposite to the side surface opposed to the side surface E11 of the transparent substrate 10 is longer than a distance L2 from the display area DA shown in FIG. 5 to the portion of the first bend portion 1A which most protrudes to the direction opposite to the second direction Y (L20>L2). The distances L2 and L20 correspond to the width in the second direction Y of the frame portion including the peripheral area PA1 and the extending portion Ex1.

In the display device DSP1 shown in FIG. 6 as a comparative example, the frame portion including the peripheral area PA1 and the extending portion Ex1 from the display area DA becomes larger than the display device DSP1 shown in FIG. 5. The width of the frame portion in the second direction Y can be reduced by disposing the wiring substrate 3 on the side of the main surface 10A of the transparent substrate 10 by the adhesive layer AD3 and connecting the transparent substrate 10 with the wiring substrate 3 by the flexible wiring substrate 1.

As described above, according to the first embodiment, the display device capable of narrowing the frame can be provided. In other words, the frame portion can be made smaller by disposing the wiring substrate 3 on the side of the main surface 10A of the transparent substrate 10 by the adhesive layer AD3, and bending the flexible wiring substrate 1 and connecting the transparent substrate 10 with the wiring substrate 3.

Furthermore, the distance L2 can be made shorter by bending the flexible wiring substrate 1 at not only the first bend portion 1A, but also the second bend portion 1C and the third bend portion 1E and connecting the flexible wiring substrate 1 with the connector 4 of the wiring substrate 3. In addition, the distance L2 can be made shorter by locating the connector 4 more closely to the side surface E31 side than the center in the second direction Y of the main surface 3A of the wiring substrate 3. Narrowing the frame on the display device DSP1 can be implemented by thus making the frame portion smaller. Moreover, various advantages as described above can be obtained from the present embodiment.

In the first embodiment, the flexible wiring substrate 1 includes two second bend portions 1C and the third bend portion 1E between the thick portion 1B and the second end portion 1b, but may include three or more bend portions between the thick portion 1B and the second end portion 1b.

Second Embodiment

A second embodiment will be described. The same constituent elements as those of the first embodiment are denoted by the same reference symbols, and their description is omitted as appropriate.

Figure 7:
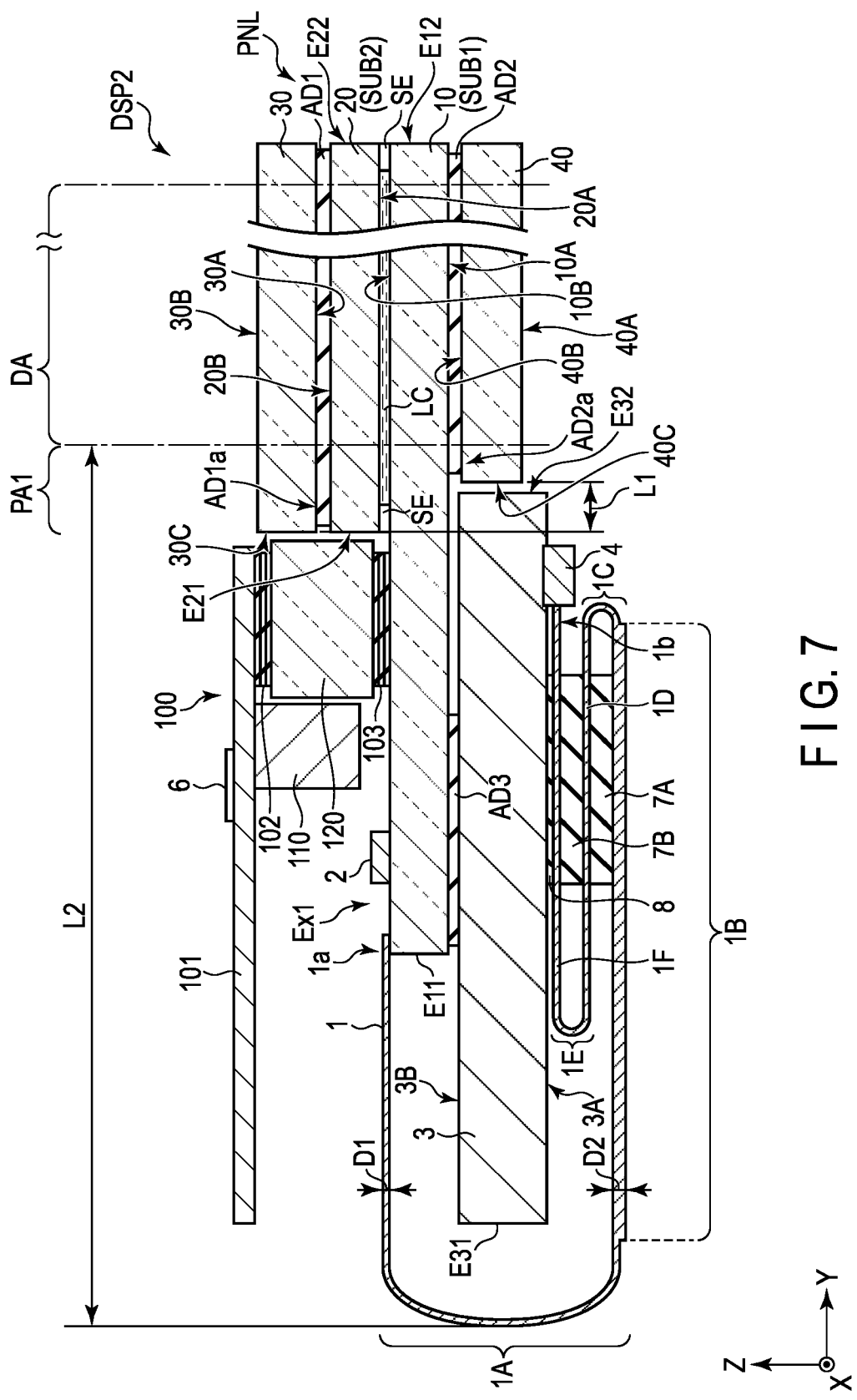
FIG. 7 is a cross-sectional view showing a configuration example of a display device according to a second embodiment.

FIG. 7 is a cross-sectional view showing a configuration example of a display device DSP2 of the second embodiment. As shown in FIG. 7, the display device DSP2 comprises a display panel PNL, a flexible wiring substrate 1, an IC chip 2, a wiring substrate 3, and a light emitting module 100. The only main parts of the display panel PNL is illustrated and simplified.

The display device DSP2 further comprises a first cover member 30, a second cover member 40, an adhesive layer AD1 bonding the second substrate SUB2 to the first cover member 30, an adhesive layer AD2 bonding the first substrate SUB1 to the second cover member 40, and an adhesive layer AD3 bonding the first substrate SUB1 to the wiring substrate 3. The flexible wiring substrate 1 includes a first bend portion 1A, a thick portion 1B, a second bend portion 1C, a first portion 1D, a third bend portion 1E, and a second portion 1F, from the first end portion 1a side, between the first end portion 1a and the second end portion 1b.

The display device DSP2 further comprises an adhesive layer 7A bonding the thick portion 1B to the first portion 1D, an adhesive portion 7B bonding the first portion 1D to the second portion 1F, and an adhesive layer 8 (fourth adhesive layer) bonding the second portion 1F to the main surface 3A of the wiring substrate 3. The display device DSP2 of the second embodiment is different from the first embodiment in comprising the adhesive layer 8. The adhesive layer 8 is formed with, for example, a double-sided tape or the like. The adhesive layer 8 may be formed of the same material as the adhesive layers 7A and 7B or may be formed of a different material.

In the example shown in FIG. 7, the width of the adhesive layer 8 in the second direction Y is substantially equal to the widths of the adhesive layers 7A and 7B in the second direction Y, but the width of the adhesive layer 8 in the second direction Y may be larger than the widths of the adhesive layers 7A and 7B in the second direction Y or the width of the adhesive layer 8 in the second direction Y may be smaller than the widths of the adhesive layers 7A and 7B in the second direction Y.

In the example shown in FIG. 7, the thickness of the adhesive layer 8 in the third direction Z is smaller than the thicknesses of the adhesive layers 7A and 7B in the third direction Z, but the thickness of the adhesive layer 8 in the third direction Z may be substantially equal to the thicknesses of the adhesive layers 7A and 7B in the third direction Z or the thickness of the adhesive layer 8 in the third direction Z may be larger than the thicknesses of the adhesive layers 7A and 7B in the third direction Z.

The flexible wiring substrate 1 can be fixed to the wiring substrate 3 and spreading of the flexible wiring substrate 1 in the third direction Z can be suppressed by providing the adhesive layer 8 between the second portion 1F and the wiring substrate 3. The load of the flexible wiring substrate 1 connected to the connector 4 on the second end portion 1*b* can be reduced by fixing the flexible wiring substrate 1 to the wiring substrate 3 by the adhesive layer 8.

Even in the structure of the display device DSP2 of the second embodiment, the display device DSP2 capable of narrowing the frame can also be obtained similarly to the first embodiment. In addition, the same advantages as those of the first embodiment can be obtained.

When the adhesive layer 8 is provided, the only adhesive layer 7A may be provided between the thick portion 1B and the first portion 1D, the only adhesive layer 7B may be provided between the first portion 1D and the second portion 1F, or each of the adhesive layers 7A and 7B may not be provided.

Third Embodiment

A third embodiment will be described. The same constituent elements as those of each of the above embodiments are denoted by the same reference symbols, and their description is omitted as appropriate.

Figure 8:
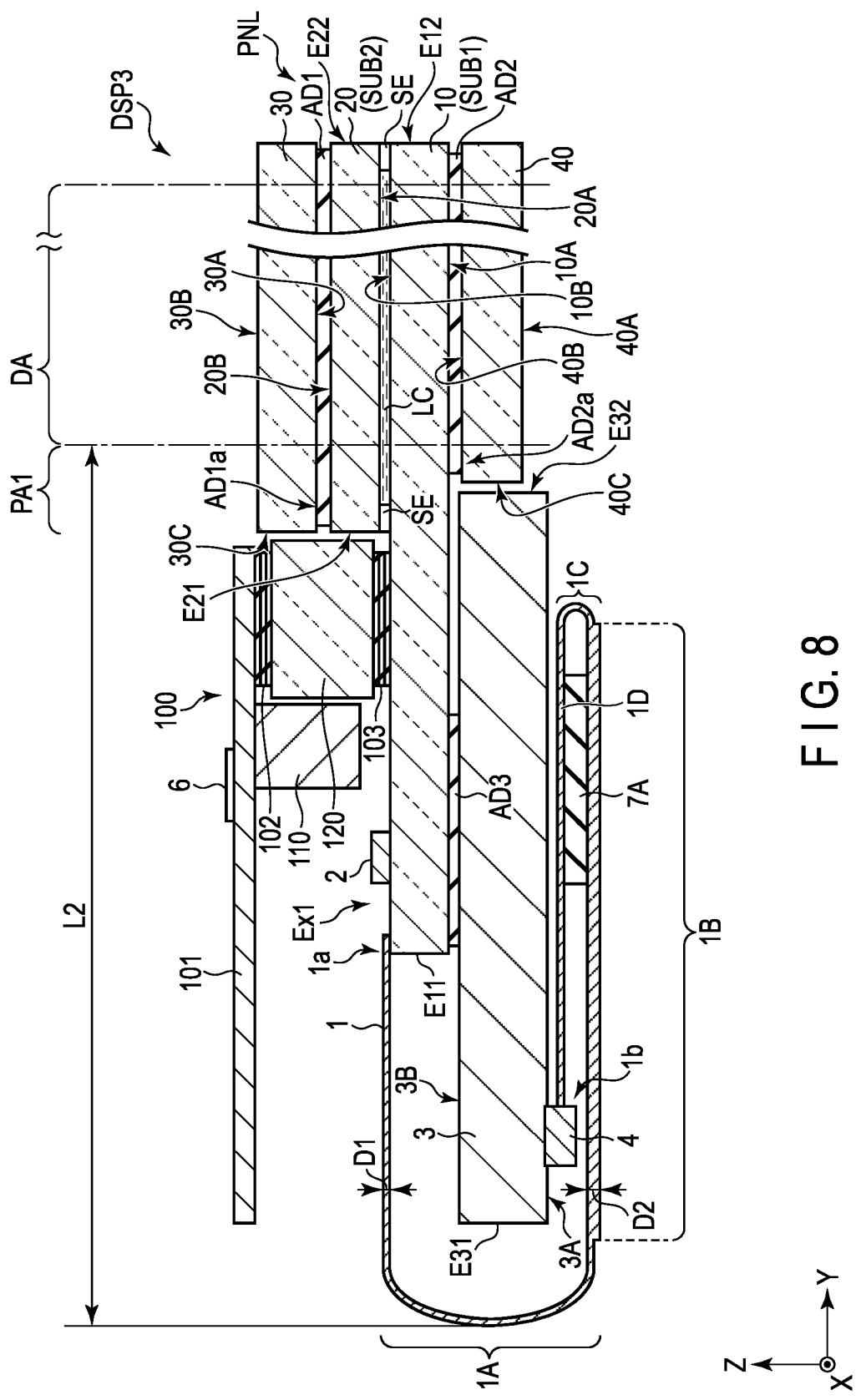
FIG. 8 is a cross-sectional view showing a configuration example of a display device according to a third embodiment.

FIG. 8 is a cross-sectional view showing a configuration example of a display device DSP3 of the third embodiment. As shown in FIG. 8, the display device DSP3 comprises a display panel PNL, a flexible wiring substrate 1, an IC chip 2, a wiring substrate 3, and a light emitting module 100. The only main parts of the display panel PNL is illustrated and simplified.

The display device DSP3 further comprises a first cover member 30, a second cover member 40, an adhesive layer AD1 bonding the second substrate SUB2 to the first cover member 30, an adhesive layer AD2 bonding the first substrate SUB1 to the second cover member 40, and an adhesive layer AD3 bonding the first substrate SUB1 to the wiring substrate 3.

The flexible wiring substrate 1 includes a first bend portion 1A, a thick portion 1B, a second bend portion 1C, and a first portion 1D, from the first end portion 1*a* side, between the first end portion 1*a* and the second end portion 1*b*. The display device DSP3 further comprises an adhesive layer 7A bonding the thick portion 1B to the first portion 1D. The display device DSP3 of the third embodiment is different from each of the above embodiments in that the flexible wiring substrate 1 does not include the third bend portion 1E and the second portion 1F.

For example, the connector 4 is located more closely to the side surface E31 side than a central portion in the second direction Y of the main surface 3A of the wiring substrate 3. However, the position of the connector 4 on the main surface 3A is not limited to the example shown in the figure. The flexible wiring substrate 1 is bent by the second bend portion 1C, and the first portion 1D is located between the wiring substrate 3 and the thick portion 1B in the third direction Z. The connector 4 is located between the wiring substrate 3 and the thick portion 1B.

The width of the frame portion in the second direction Y can be reduced, depending on the position of the connector 4 on the main surface 3A, when the flexible wiring substrate 1 is bent by the first bend portion 1A and the second bend portion 1C to connect the transparent substrate 10 with the wiring substrate 3. Even in the structure of the display device DSP3 of the third embodiment, the display device DSP3 capable of narrowing the frame can be obtained similarly to each of the above embodiments. In addition, various advantages as those of each of the above embodiments can be obtained.

In the example shown in FIG. 8, the width of the adhesive layer 7A in the second direction Y is substantially equal to that in the examples shown in FIG. 5 and FIG. 7, but may be larger or smaller than that in the examples shown in FIG. 5 and FIG. 7. The display device DSP3 of the third embodiment may further comprise an adhesive layer between the wiring substrate 3 and the first portion 1D.

All of the display devices that can be implemented by a person of ordinary skill in the art through arbitrary design changes to the display devices described above as embodiments of the present invention come within the scope of the present invention as long as they are in keeping with the spirit of the present invention. Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
   a first substrate having a first surface, a second surface on a side opposite to the first surface, and a first side surface connecting the first surface with the second surface;
   a second substrate having a second side surface and being opposed to the first surface;
   a light source provided along the second side surface of the second substrate;
   a wiring substrate opposed to the second surface of the first substrate;
   a first adhesive layer bonding the second surface to the wiring substrate; and
   a flexible wiring substrate electrically connecting the first substrate with the wiring substrate,
   the first substrate including an extending portion that includes the first side surface and extends further than the second side surface of the second substrate,
   the flexible wiring substrate being mounted on the extending portion, and
   the wiring substrate protruding from the first side surface of the first substrate.

2. The display device of claim 1, wherein
   the flexible wiring substrate includes a first end portion connected to the extending portion, a second end portion connected to the wiring substrate, and a first bend portion between the first end portion and the second end portion, and
   the flexible wiring substrate is bent toward a side of the second surface of the first substrate by the first bend portion.

3. The display device of claim 2, wherein
the flexible wiring substrate further includes a thick portion between the first bend portion and the second end portion,
a thickness of the thick portion is larger than a thickness of the first bend portion, and
the thick portion overlaps the wiring substrate in a thickness direction of the first substrate.

4. The display device of claim 3, wherein
the flexible wiring substrate further includes a second bend portion between the thick portion and the second end portion, and a first portion between the second bend portion and the second end portion, and
the first portion is located between the thick portion and the wiring substrate in the thickness direction.

5. The display device of claim 4, further comprising:
a second adhesive layer bonding the thick portion to the first portion.

6. The display device of claim 4, wherein
the flexible wiring substrate further includes a third bend portion between the first portion and the second end portion, and a second portion between the third bend portion and the second end portion, and
the second portion is located between the first portion and the wiring substrate in the thickness direction.

7. The display device of claim 6, further comprising:
a third adhesive layer bonding the first portion to the second portion.

8. The display device of claim 6, further comprising:
a fourth adhesive layer bonding the second portion to the wiring substrate.

9. The display device of claim 1, further comprising:
a polymer dispersed liquid crystal layer disposed between the first substrate and the second substrate.

10. The display device of claim 1, wherein
the wiring substrate includes a third surface opposed to the second surface, a fourth surface on a side opposite to the third surface, and a connector provided on the fourth surface, and
the flexible wiring substrate is connected to the connector.

* * * * *